(12) United States Patent
Yang et al.

(10) Patent No.: US 11,726,949 B2
(45) Date of Patent: Aug. 15, 2023

(54) SYSTEM AND METHOD FOR SELECTIVELY REPROCESSING VIDEO STREAMS BASED ON SYSTEM RESOURCES AND STREAM STATUS

(71) Applicant: SAMSUNG ELECTRONICS CO., LTD., Suwon-si (KR)

(72) Inventors: Jung Yeop Yang, Seoul (KR); Ju Won Byun, Hwaseong-si (KR); Sung Ho Jun, Hwaseong-si (KR); Yo Won Jeong, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/570,863

(22) Filed: Jan. 7, 2022

(65) Prior Publication Data
US 2022/0382708 A1    Dec. 1, 2022

(30) Foreign Application Priority Data

May 28, 2021    (KR) .................. 10-2021-0068734
Jun. 29, 2021    (KR) .................. 10-2021-0084631

(51) Int. Cl.
  *G06F 15/78*    (2006.01)
(52) U.S. Cl.
  CPC .................. *G06F 15/7821* (2013.01)
(58) Field of Classification Search
  CPC .................................................. G06F 15/7821
  See application file for complete search history.

(56) References Cited

U.S. PATENT DOCUMENTS

| 8,249,426 | B2 | 8/2012 | Kellock et al. |
| 10,595,061 | B2 | 3/2020 | Ekstrom et al. |
| 10,681,282 | B1 | 6/2020 | Manzari et al. |
| 10,778,979 | B2 | 9/2020 | Ramasubramonian et al. |
| 10,826,963 | B2 | 11/2020 | Jain |

(Continued)

FOREIGN PATENT DOCUMENTS

| EP | 3 444 788 A1 | 2/2019 |
| KR | 10-2095518 B1 | 3/2020 |

OTHER PUBLICATIONS

Ravikumar, C.P., "Multiprocessor Architectures for Embedded System-on-chip Applications", 2004 Proceedings of the 17th International Conference on VLSI Design, IEEE Comput. Soc, Jan. 5, 2004, pp. 512-519, XP010679043.

(Continued)

*Primary Examiner* — Jacob Petranek
(74) *Attorney, Agent, or Firm* — Sughrue Mion, PLLC

(57) ABSTRACT

Provided are a stream reprocessing system on chip (SoC) and a method for operating the same is provided. The stream reprocessing system includes a plurality of processors including a central processing unit (CPU); a memory controller configured to receive a stream; and a stream reprocessor configured to perform reprocessing the stream, wherein the stream reprocessor includes: a control unit configured to determine whether to perform the reprocessing on the stream; a reprocessing unit configured to reprocess the stream based on receiving a command to perform the reprocessing on the stream from the control unit; and an output unit configured to transmit the reprocessed stream to a memory.

19 Claims, 19 Drawing Sheets

(56) References Cited

U.S. PATENT DOCUMENTS

| | | |
|---|---|---|
| 2008/0120676 A1* | 5/2008 | Morad ............. H04N 21/42607 |
| | | 375/E7.076 |
| 2012/0263241 A1 | 10/2012 | Swenson et al. |
| 2014/0173252 A1 | 6/2014 | Tomono et al. |
| 2015/0316978 A1* | 11/2015 | Kim ...................... G06F 3/0601 |
| | | 710/308 |
| 2016/0073351 A1 | 3/2016 | Cardozo et al. |
| 2016/0150229 A1* | 5/2016 | Jun ...................... H04N 19/172 |
| | | 375/240.03 |
| 2016/0234496 A1* | 8/2016 | Panda .................. H04N 19/172 |
| 2017/0374361 A1* | 12/2017 | Carmel ................ H04N 19/124 |
| 2019/0158855 A1 | 5/2019 | He et al. |
| 2020/0322535 A1 | 10/2020 | Khoe et al. |
| 2020/0364025 A1 | 11/2020 | Riedmiller et al. |

OTHER PUBLICATIONS

Khailany, Brucek et al., "A Programmable 512 GOPS Stream Processor for Signal, Image, and Video Processing", 2007 IEEE International Solid-State Circuits Conference (IEEE Cat. No. 07CH37858), Feb. 1, 2007, XP031180081. (3 pages total).

Communication dated Jun. 29, 2022 by the European Patent office in counterpart European Patent Application No. 22151085.2.

Communication dated Jul. 11, 2022 by the European Patent office in counterpart European Patent Application No. 22151085.2.

\* cited by examiner

1

SYSTEM AND METHOD FOR SELECTIVELY REPROCESSING VIDEO STREAMS BASED ON SYSTEM RESOURCES AND STREAM STATUS

CROSS-REFERENCE TO THE RELATED APPLICATION(S)

This application claims priority from Korean Patent Application No. 10-2021-0068734, filed on May 28, 2021 in the Korean Intellectual Property Office, and Korean Patent Application No. 10-2021-0084631, filed on Jun. 29, 2021 in the Korean Intellectual Property Office, and all the benefits accruing therefrom under 35 U.S.C. 119, the contents of which in its entirety are herein incorporated by reference.

BACKGROUND

1. Technical Field

The disclosure relates to a stream reprocessing system and a method for operating the same. More particularly, the disclosure relates to a stream reprocessor and a system on chip (SoC) including the same.

2. Description of the Related Art

An amount of video data to be processed by a video processor implemented as hardware or software gradually increases. However, when the video processor does not have resources enough to process the video data, efficiency of video data processing may be deteriorated.

For example, resources of a portable device such as a smartphone are very limited, and thus, video data captured by a camera may not be compressed effectively enough. Therefore, a problem that a space for storing a compressed video stream is insufficient or an image quality is deteriorated may occur. Accordingly, there is a need to increase efficiency of data processing or a quality of the video data processed through the limited resources as described above through more efficient video data reprocessing.

SUMMARY

Aspects of the disclosure provide a stream reprocessing system on chip (SoC) that improves subjective and/or objective qualities by reprocessing, using sufficient resources, unprocessed video data (e.g., video data that have not been processed by applying a video data processing algorithm, such as compression of video data, change of spatial and/or temporal resolution, and removal of noise), a stream reprocessing system including the same, and a method for operating the same.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of the disclosure, there is provided a stream reprocessing system on chip including: a plurality of processors including a central processing unit (CPU); a memory controller configured to receive a stream; and a stream reprocessor configured to perform reprocessing the stream, wherein the stream reprocessor includes: a control unit configured to determine whether to perform the reprocessing on the stream; a reprocessing unit configured to reprocess the stream based on receiving a command to perform the reprocessing on the stream from the control unit; and an output unit configured to transmit the reprocessed stream to a memory.

According to an aspect of the disclosure, there is provided a stream reprocessing system including: a camera; a codec configured to generate a stream by compressing frames received through the camera; a plurality of processors including a central processing unit, the central processing unit being configured to control the codec; a display configured to, under control of at least one of the plurality of processors, output the stream compressed through the codec; a memory configured to store the stream; and a stream reprocessor configured to reprocess the stream, wherein the stream reprocessor includes: a control unit configured to determine whether to perform the reprocessing on the stream; a reprocessing unit reprocessing the stream based on receiving a command to perform the reprocessing on the stream from the control unit; and an output unit configured to transmit the reprocessed stream to the memory.

According to an aspect of the disclosure, there is provided a stream reprocessing system including: a processor configured to control at least one of an input or an output of a stream; and a memory configured to store the stream, wherein the stream is reprocessed based on a degree of compression of the stream determined through at least one a codec algorithm, a super-resolution (SR) algorithm, a frame rate conversion (FRC) algorithm, an image signal processing (ISP) algorithm, or a denoising algorithm operating in non-real time.

According to an aspect of the disclosure, there is provided a method for operating a stream reprocessing system, including: receiving a stream from an outside; determining, by using a control unit of the stream reprocessing system, whether to perform reprocessing on the stream; reprocessing, by using a reprocessing unit of the stream reprocessing system, the stream based on a command to perform the reprocessing on the stream, which received from the control unit; and transmitting, by using an output unit of the stream reprocessing system, the reprocessed stream to an outside.

According to an aspect of the disclosure, there is provided a stream reprocessing system including: a stream reprocessor configured to receive a stream from an outside, determine whether to perform reprocessing on the stream, and perform the reprocessing on the stream based on receiving a command to perform the reprocessing on the stream; a display configured to display a method of updating the reprocessed stream; a user interface configured to provide an interface through which a selection of the method of updating the reprocessed stream is received; and a central processing unit configured to, based on receiving the selection, update the reprocessed stream by using the method of updating the reprocessed stream.

According to an aspect of the disclosure, there is provided a stream reprocessing system including: a stream reprocessor configured to receive a stream from an outside, determining whether to perform reprocessing on the stream, and perform the reprocessing on the stream based on receiving a command to perform the reprocessing on the stream; a display configured to display whether the stream reprocessor is to automatically perform the reprocessing on the stream; and a user interface configured to receive an input of whether to automatically perform the reprocessing on the stream, wherein the stream reprocessor is further configured to: automatically perform the reprocessing on streams based on an input, through the user interface, of a command to automatically perform the reprocessing on the stream; and provide, through the user interface, a message regarding whether to perform the reprocessing on the streams based on the command to automatically perform the reprocessing on the stream being not received through the user interface.

According to an aspect of the disclosure, there is provided a method for operating a user interface, including: receiving a stream from an outside, determining whether to perform reprocessing on the stream, and performing the reprocessing on the stream, by using a stream reprocessor, based on receiving a command to perform the reprocessing on the stream; displaying, through a display, a method of updating the reprocessed stream; providing, through a user interface, an interface configured to receive a selection of the method of updating the reprocessed stream; and updating, by using a central processing unit, the reprocessed stream by using the method of updating the reprocessed stream, based on an input received through the user interface.

According to an aspect of the disclosure, there is provided a method for operating a user interface, including: receiving a stream from an outside, determining whether to perform reprocessing on the stream, and performing the reprocessing on the stream by using a stream reprocessor, based on receiving a command to perform the reprocessing on the stream; displaying, through a display, whether the stream reprocessor is to automatically perform the reprocessing on the stream; and providing, through a user interface, an interface configured to receive an input of whether to automatically perform the reprocessing on the stream, wherein the method further includes: automatically performing the reprocessing on streams based on an input, through the user interface, of a command to automatically perform the reprocessing on the stream; and providing, through the user interface, a message regarding whether to perform the reprocessing on the streams based on the command to automatically perform the reprocessing on the stream being not received through the user interface.

BRIEF DESCRIPTION OF THE DRAWINGS

The above and other aspects and features of the disclosure will become more apparent by describing in detail exemplary embodiments thereof with reference to the attached drawings, in which.

DETAILED DESCRIPTION

Hereinafter, embodiments of the inventive concept will be described in detail with reference to the accompanying drawings.

Figure 1:
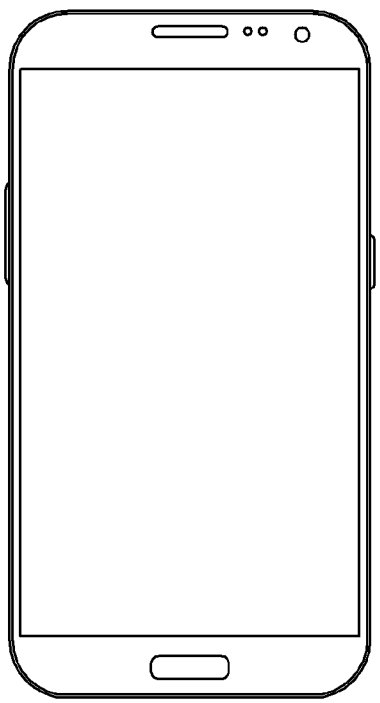
FIG. 1 is an illustrative view for describing an electronic device including a stream reprocessing system according to some exemplary embodiments.

FIG. 1 is an illustrative view for describing an electronic device including a stream reprocessing system according to some exemplary embodiments.

Referring to FIG. 1, an electronic device 1 including a stream reprocessing system according to some exemplary embodiments may include a smartphone, but is not limited thereto.

For example, the electronic device 1 including a stream reprocessing system according to some exemplary embodiments may be implemented as a television (TV), a digital TV (DTV), an internet protocol TV (IPTV), a personal computer (PC), a desktop computer, a laptop computer, a computer workstation, a tablet PC, a video game platform (or a video game console), a server, or a portable electronic device.

The portable electronic device may include a mobile phone, a smartphone, a personal digital assistant (PDA), an enterprise digital assistant (EDA), a digital still camera, a digital video camera, a portable multimedia player (PMP), a personal navigation device or portable navigation device (PND), a mobile internet device (MID), a wearable computer, an internet of things (IoT) device, an internet of everything (IoE) device, or an e-book.

The stream reprocessing system may refer to various display devices capable of processing two-dimensional (2D) and/or three-dimensional (3D) graphics data and displaying the processed data.

Hereinafter, a stream reprocessing system according to some exemplary embodiments will be described in detail.

Figure 2:
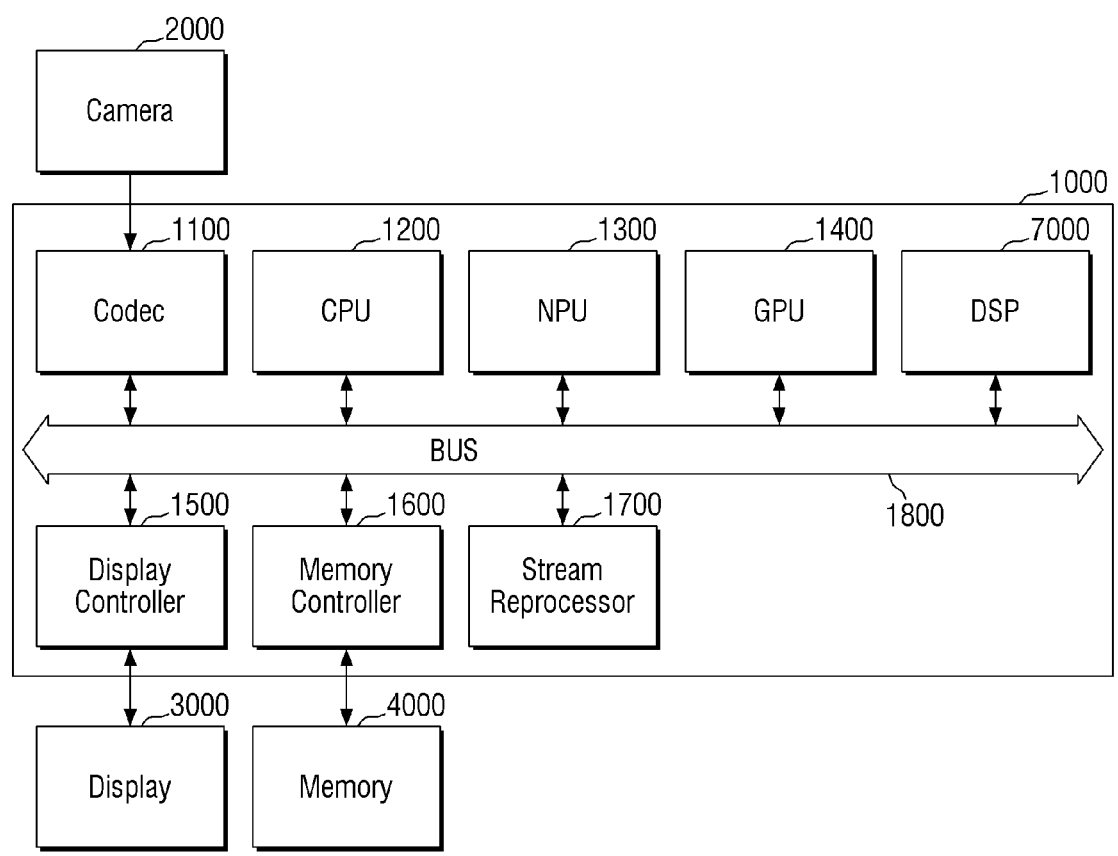
FIG. 2 is an illustrative block diagram for describing a stream reprocessing system according to some exemplary embodiments.

FIG. 2 is an illustrative block diagram for describing a stream reprocessing system 10 according to some exemplary embodiments.

Referring to FIG. 2, the stream reprocessing system 10 according to some exemplary embodiments may include a stream reprocessing system on chip (SoC) 1000 (hereinafter, referred to as a system on chip for simplification of explanation), a camera 2000, a display 3000, and a memory 4000. In the stream reprocessing system 10 according to some exemplary embodiments, the memory 4000 may be disposed outside the system on chip 1000, but the disclosure is not limited thereto, and the memory 4000 may also be provided in the system on chip 1000.

The system on chip 1000 may generally control an operation of the stream reprocessing system 10. For example, system on chips 1000, 1002 (see FIG. 11), and 1004 (see FIG. 17) may refer to integrated circuits (ICs), motherboards, application processor (APs), or mobile APs capable of performing operations of stream reprocessing systems 10, 20 (see FIG. 11), and 30 (see FIG. 17) according to some exemplary embodiments to be described below.

Hereinafter, a description for the stream reprocessing system 10 described with reference to FIG. 2 may also be applied to the stream reprocessing system 20 of FIG. 11 and the stream reprocessing system 30 of FIG. 17. In addition, a description for the system on chip 1000 described with reference to FIG. 2 may also be applied to the system on chip 1002 of FIG. 11 and the system on chip 1004 of FIG. 17.

The system on chip 1000 may process image data, for example, frames, that are output from the camera 2000 to generate a stream, and may display the processed stream through the display 3000 or store the processed stream in the memory 4000.

The system on chip 1000 may include a codec 1100, a central processing unit (CPU) 1200, a neural processing unit (NPU) 1300, a graphics processing unit (GPU) 1400, a digital signal processor (DSP) 7000, a display controller 1500, a memory controller 1600, and a stream reprocessor 1700.

The codec 1100, the central processing unit 1200, the neural processing unit 1300, the graphics processing unit 1400, the digital signal processor 7000, the display controller 1500, the memory controller 1600, and the stream reprocessor 1700 may exchange data with each other via a bus 1800. For example, the bus 1800 may be implemented as a peripheral component interconnect (PCI) bus, a PCI express bus, an advanced microcontroller bus architecture (AMBA), an advanced high performance bus (AHB), an advanced peripheral bus (APB), or an advanced extensible interface (AXI) bus, or any combinations thereof.

The codec 1100 may encode frames obtained from the camera 2000 or frames stored in the memory 4000 or may decode streams stored in the memory 4000. The camera 2000 may be implemented as a complementary metal oxide semiconductor (CMOS) image sensor.

The central processing unit 1200, the neural processing unit 1300, the graphics processing unit 1400, and the digital signal processor 7000 may control an operation of the system on chip 1000. In the system on chip described below, components illustrated as general-purpose hardware are not limited to the central processing unit 1200, the neural processing unit 1300, the graphics processing unit 1400, and the digital signal processor 7000.

A user may provide an input to the system on chip 1000 so that the CPU 1200 may execute one or more applications (e.g., application software).

The one or more applications executed by the central processing unit 1200, the neural processing unit 1300, the graphics processing unit 1400, and the digital signal processor 7000 may include, for example, an operating system (OS), a word processor application, a media player application, a video game application, and/or a graphical user interface (GUI) application.

The display controller 1500 may allow the display 3000 to display image data output from the codec 1100, the central processing unit 1200, the neural processing unit 1300, the graphics processing unit 1400, and the digital signal processor 7000. The display 3000 may be implemented as a monitor, a TV monitor, a projection device, a thin film transistor-liquid crystal display (TFT-LCD), a light emitting diode (LED) display, an organic LED (OLED) display, and an active-matrix OLED (AMOLED) display, or a flexible display, but is not limited thereto.

For example, the display controller 1500 may transmit the image data to the display 3000 through a display serial interface (DSI).

The memory controller 1600 may read data stored in the memory 4000 based on a command output from the codec 1100, the central processing unit 1200, the neural processing unit 1300, and/or the graphics processing unit 1400, and transmit the read data to the codec 1100, the central processing unit 1200, the neural processing unit 1300, and/or the graphics processing unit 1400. In addition, the memory controller 1600 may write data output from the codec 1100, the central processing unit 1200, the neural processing unit 1300, and/or the graphics processing unit 1400 to the memory 4000 based on a command output from the codec 1100, the central processing unit 1200, the neural processing unit 1300, and/or the graphics processing unit 1400.

According to some exemplary embodiments, the memory 4000 may be implemented as a volatile memory and/or a non-volatile memory. The volatile memory may be implemented as a random access memory (RAM), a static RAM (SRAM), a dynamic RAM (DRAM), a synchronous DRAM (SDRAM), a thyristor RAM (T-RAM), a zero capacitor RAM (Z-RAM), or a twin transistor (TTRAM), but is not limited thereto.

The non-volatile memory may be implemented as an electrically erasable programmable read-only memory (EE-PROM), a flash memory, a magnetic RAM (MRAM), a spin-transfer torque MRAM, a ferroelectric RAM (Fe-RAM), a phase change RAM (PRAM)), or a resistive RAM (RRAM). In addition, the non-volatile memory may be implemented as a multimedia card (MMC), an embedded MMC (eMMC), a universal flash storage (UFS), a solid state drive (SSD), a USB flash drive, or a hard disk drive (HDD), but is not limited thereto.

The stream reprocessor 1700 may exchange streams with other components (e.g., the display controller 1500, the memory controller 1600, the codec 1100, the central processing unit 1200, the neural processing unit 1300, and/or the graphics processing unit 1400) via the bus 1800.

The stream reprocessor 1700 may be configured as dedicated hardware (e.g., hardware capable of operating only according to a design intention of a manufacturer, such as the codec 1100).

Alternatively, the stream reprocessor 1700 may be configured as software that may use resources of general-purpose hardware (e.g., the central processing unit 1200, the neural processing unit 1300, the graphics processing unit 1400, and/or the digital signal processor 7000). As an example, the stream reprocessor 1700 may be an application already included in the system on chip 1000 when the system on chip 1000 is manufactured. As another example, the stream reprocessor 1700 may be configured in the form of an application that a user may download from the outside of the stream reprocessing system 10 (e.g., a server 6000 of FIG. 17).

The stream reprocessor 1700 will be described in more detail with reference to FIG. 3.

Figure 3:
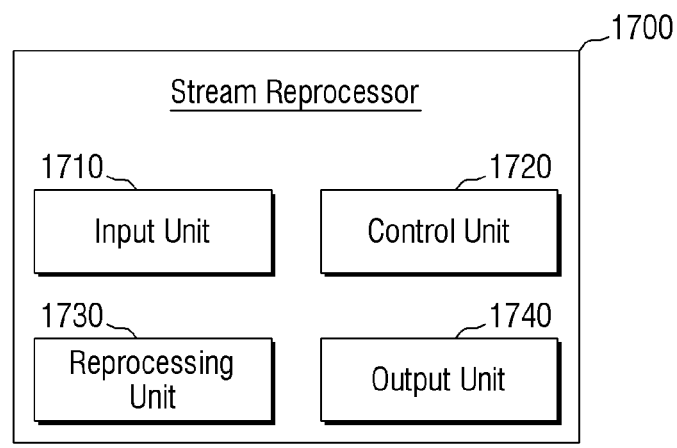
FIG. 3 is an illustrative block diagram for describing a stream reprocessor according to some exemplary embodiments.

FIG. 3 is an illustrative block diagram for describing the stream reprocessor according to some exemplary embodiments.

Referring to FIGS. 2 and 3, the stream reprocessor 1700 includes an input unit 1710, a control unit 1720, a reprocessing unit 1730, and an output unit 1740. A description for the stream reprocessor 1700 may also be applied to a stream reprocessor 1702 of FIG. 15.

The input unit 1710 may receive streams from components (e.g., the display controller 1500, the memory controller 1600, the codec 1100, the central processing unit 1200, the neural processing unit 1300, and/or the graphics processing unit 1400) other than the stream reprocessor 1700.

The input unit 1710 may transmit the stream to the control unit 1720. In this case, the control unit 1720 may determine whether or not to perform reprocessing on the stream. The control unit 1720 will be described in more detail with reference to FIG. 4.

Figure 4:
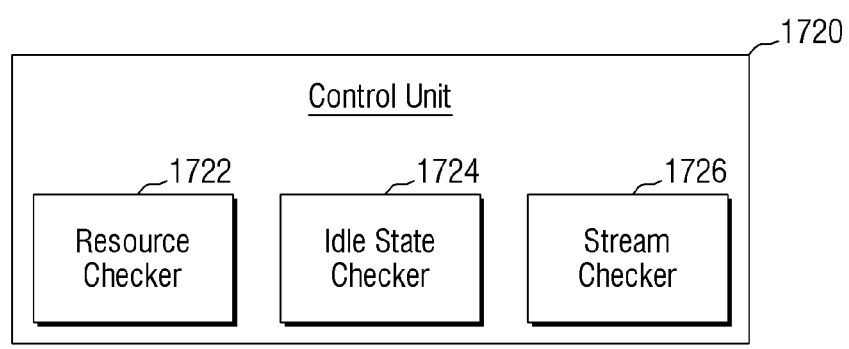
FIG. 4 is an illustrative block diagram for describing a control unit in a stream reprocessor according to some exemplary embodiments.

FIG. 4 is an illustrative block diagram for describing a control unit in the stream reprocessor according to some exemplary embodiments.

Referring to FIGS. 2 to 4, the control unit 1720 includes a resource checker 1722, an idle state checker 1724, and a stream checker 1726.

The resource checker 1722 determines whether or not there are sufficient resources (e.g., a state of charge (SoC) of a battery being a certain percentage or higher) for the stream reprocessor 1700 to reprocess the stream received through the input unit 1710 or the stream reprocessing system 10 has been connected to a power source through a power cable.

The resources determined by the resource checker 1722 are not limited to the SoC of the battery. As an example, the resource checker 1722 may determine whether or not the stream reprocessing system 10 has been connected to the power source through the power cable to supply stable power for the stream reprocessor 1700 to perform a reprocessing operation. As another example, when the stream reprocessing system 10 is not connected to the power cable, the resource checker 1722 may determine whether or not an SoC of a battery indicates that sufficient battery power for the stream reprocessor 1700 to perform a reprocessing operation has been secured. As another example, even if the stream reprocessing system 10 is connected to the power cable or the SoC of the battery is sufficient, the resource checker 1722 may determine whether or not resources sufficient for the stream reprocessor 1700 to perform a reprocessing operation have been secured by periodically checking utilized resources of background applications that consume the resources of the stream reprocessing system 10.

The idle state checker 1724 may determine whether or not the electronic device including the stream reprocessing system 10 is in a standby state in which the electronic device is operable by the user, but the user does not currently use the electronic device.

As an example, the idle state checker 1724 determines whether or not the display 3000 has been turned off, and determines that the electronic device including the stream reprocessing system 10 is in an idle state in which the user is not using the electronic device including the stream reprocessing system 10 based on a determination that the display 3000 has been turned off.

As another example, even if the display 3000 is turned on, the idle state checker 1724 may determine that the electronic device including the stream reprocessing system 10 is in an idle state in which the user is not using the electronic device including the stream reprocessing system 10, when it is determined that there is no application operating in the electronic device including the stream reprocessing system 10.

The stream checker 1726 determines whether or not the stream received through the input unit 1710 needs to be reprocessed.

As an example, the stream checker 1726 may check whether or not the received stream has been compressed efficiently enough (e.g., a certain compression rate or higher) through a predetermined algorithm included in the stream reprocessing system 10, and determine that the received stream does not need to be reprocessed when the received stream has been compressed efficiently enough.

As another example, the stream checker 1726 may check whether or not a subjective image quality (e.g., an image quality perceived by a person) of the received stream is determined to be a higher image quality through a predetermined algorithm included in the stream reprocessing system 10, and determine that the received stream does not need to be reprocessed when the subjective image quality of the received stream is determined as sufficiently high image quality.

The control unit 1720 transmits a command for reprocessing the stream to the reprocessing unit 1730 when it is determined through the resource checker 1722 that the SoC of the battery is enough, it is determined through the idle state checker 1724 that the electronic device is not being used (e.g., the display 3000 has been turned off), and it is determined through the stream checker 1726 that the stream needs to be reprocessed.

The operation order of each of the resource checker 1722, the idle state checker 1724, and the stream checker 1726 is not limited. For example, all of the resource checker 1722, the idle state checker 1724, and the stream checker 1726 may operate simultaneously. Alternatively, the resource checker 1722, the idle state checker 1724, and the stream checker 1726 may be sequentially operated in this order or any other order.

After an initial stream reprocessing command is transmitted to the reprocessing unit 1730 through the control unit 1720, the control unit 1720 may periodically operate all or some of the resource checker 1722, the idle state checker 1724, and the stream checker 1726, and when one or more conditions of the operated checkers 1722, 1724, 1726 are not satisfied, transmit a command to stop the reprocessing operation, to store an intermediate stage of the reprocessing operation in the memory 4000, and/or to restart the reprocessing operation to the reprocessing unit 1730.

The components of the control unit 1720 described above are an example, and at least some of the resource checker 1722, the idle state checker 1724, and the stream checker 1726 in the control unit 1720 may also be omitted. In addition, the components of the control unit 1720 are not limited to those described above, and any component related to reprocessing of the stream (e.g., an operation of determining whether or not to perform the reprocessing on the stream) may be added to the control unit 1720.

Again referring to FIGS. 2 and 3, the reprocessing unit 1730 that receives the stream reprocessing command from the control unit 1720 may perform the reprocessing on the stream. The reprocessing unit 1730 will be described in more detail with reference to FIG. 5.

Figure 5:
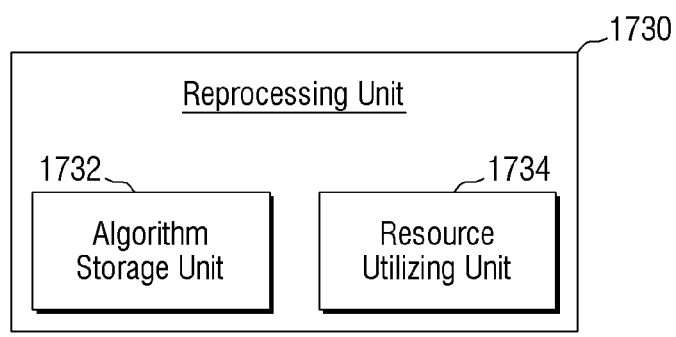
FIG. 5 is an illustrative block diagram for describing a reprocessing unit in a stream reprocessor according to some exemplary embodiments.

FIG. 5 is an illustrative block diagram for describing a reprocessing unit in the stream reprocessor according to some exemplary embodiments.

Referring to FIGS. 2, 3, and 5, the reprocessing unit 1730 includes an algorithm storage unit 1732 and a resource utilizing unit 1734.

The algorithm storage unit 1732 stores an algorithm utilized by the reprocessing unit 1730 to perform the reprocessing on the stream.

As an example, the algorithm storage unit 1732 may include a codec algorithm capable of decoding and encoding the stream input through the input unit 1710. In particular, the algorithm storage unit 1732 may store codecs that perform reprocessing in non-real time to generate a high-cost, high-compression, and high-quality reprocessed stream. For example, the algorithm storage unit 1732 may include a codec, which includes a multi pass coding algorithm, a rate distortion optimization (RDO) algorithm, a group of pictures (GOP) algorithm, and/or a standard change algorithm.

As another example, the algorithm storage unit 1732 may include a super-resolution (SR) algorithm that improves a spatial resolution of a video stream input through the input unit 1710, a frame rate conversion (FRC) algorithm that improves a temporal resolution (e.g., frame per second (FPS)) of the video stream, an image signal processing (ISP) algorithm that improves a subjective image quality of a reconstructed image, a brightness/contrast correction algorithm, and/or a denoising algorithm.

As another example, the algorithm storage unit 1732 may include a deep learning algorithm that improves a compression rate and/or a subjective image quality of a video stream.

The resource utilizing unit 1734 may utilize resources required for the reprocessing unit 1730 to reprocess the stream from general-purpose hardware (e.g., the central processing unit 1200, the neural processing unit 1300, and/or the graphics processing unit 1400).

For example, it is assumed that the reprocessing unit 1730 reprocesses the stream, by using the super-resolution algorithm or the frame rate conversion algorithm stored in the algorithm storage unit 1732 based on deep learning. In this case, the reprocessing unit 1730 may extract the super-resolution algorithm or the frame rate conversion algorithm of the algorithm storage unit 1732, and perform reprocessing on the stream by utilizing a resource of the neural processing unit through the resource utilizing unit 1734.

The stream reprocessed through the reprocessing unit 1730 may have a smaller size than the stream before being reprocessed. Alternatively, a format of the stream reprocessed through the reprocessing unit 1730 may be different from that of the stream before being reprocessed. Alternatively, the stream reprocessed through the reprocessing unit 1730 may have a subjective image quality improved as compared with the stream before being reprocessed.

Referring back to FIGS. 2 and 3, the stream reprocessed through the reprocessing unit 1730 is transmitted to the output unit 1740. The stream transmitted to the output unit 1740 may be transmitted to components (e.g., the display controller 1500, the memory controller 1600, the codec 1100, the central processing unit 1200, the neural processing unit 1300, and/or the graphics processing unit 1400) other than the stream reprocessor 1700 via the bus 1800.

The above-described operation will be described in detail with reference to the following flowchart.

Figure 6:
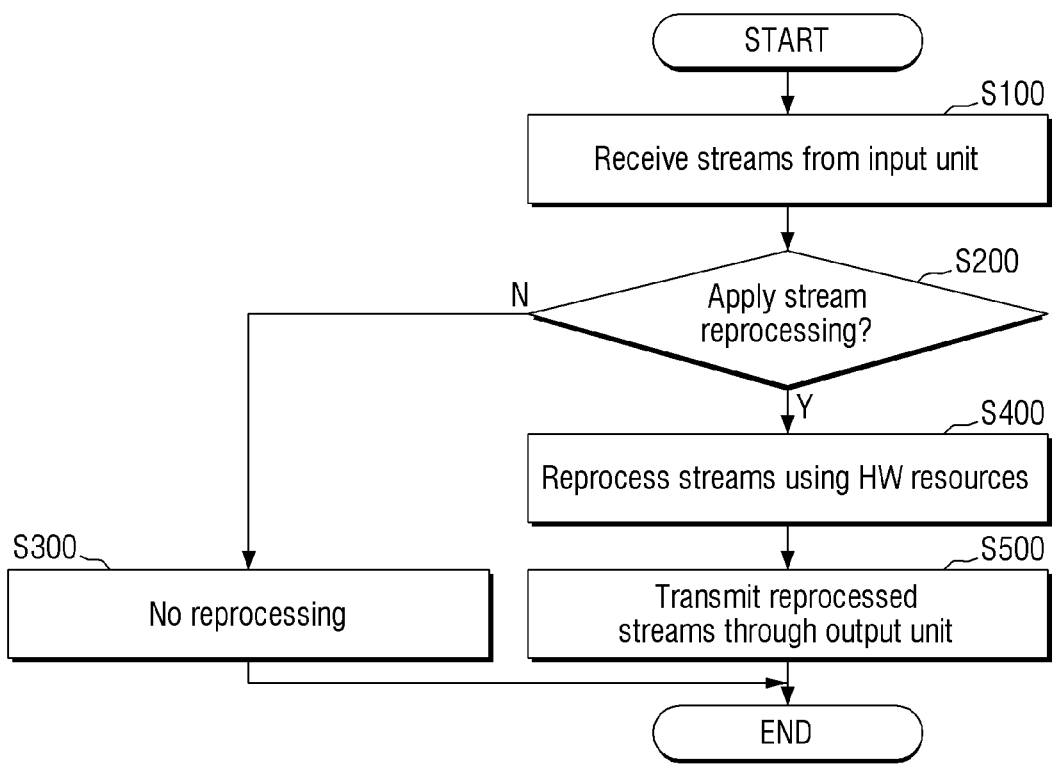
FIG. 6 is an illustrative flowchart for describing a method for operating a stream reprocessor according to some exemplary embodiments.

FIG. 6 is an illustrative flowchart for describing a method for operating the stream reprocessor according to some exemplary embodiments.

Referring to FIGS. 3 and 6, the stream reprocessor 1700 according to some exemplary embodiments receives the stream through the input unit 1710 (S100). Then, the stream reprocessor 1700 may determine whether or not to perform reprocessing on the stream through the control unit 1720 (S200). The determining (S200) of whether or not to perform the reprocessing on the stream will be described in detail with reference to FIG. 7.

Figure 7:
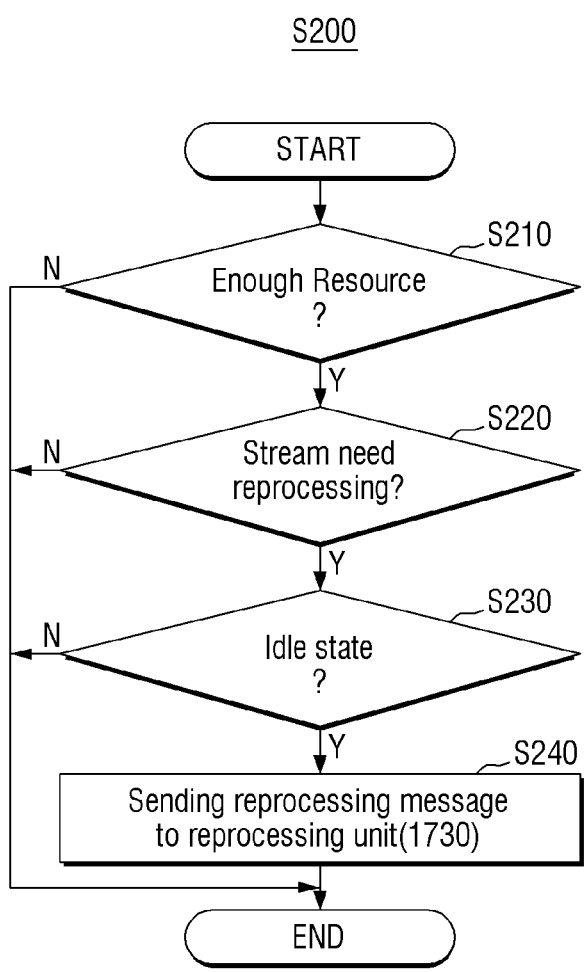
FIG. 7 is an illustrative flowchart for describing operations of a control unit in a stream reprocessor according to some exemplary embodiments.

FIG. 7 is an illustrative flowchart for describing operations of the control unit in the stream reprocessor according to some exemplary embodiments.

Referring to FIGS. 2, 3, 4, and 7, the control unit 1720 determines whether or not the stream reprocessing system 10 has secured resources enough for the stream reprocessor 1700 to reprocess the stream received through the input unit 1710, through the resource checker 1722 (S210). When it is determined that the resources enough for the stream reprocessor 1700 have not been secured (No at S210), the reprocessing is not performed on the stream.

On the other hand, when it is determined that the resources enough for the stream reprocessor 1700 have been secured (Yes at S210), the control unit 1720 determines whether or not the stream needs to be reprocessed through the stream checker 1726 (S220). When it is determined that the stream does not need to be reprocessed (No at S220), the reprocessing is not performed on the stream.

On the other hand, when it is determined that the reprocessing of the stream needs to be reprocessed (Yes at S220), the control unit 1720 determines whether or not the electronic device including the stream reprocessing system 10 is in an idle state (e.g., determines whether or not the display has been turned off) through the idle state checker 1724 (S230). When the electronic device including the stream reprocessing system 10 is not in the idle state (e.g., when the display has not been turned off) (No at S230), the reprocessing is not performed on the stream.

On the other hand, when the electronic device including the stream reprocessing system 10 is in the idle state (e.g., when the display has been turned off) (Yes at S230), the control unit 1720 sends a stream reprocessing command to the reprocessing unit 1730 (S240) to allow the reprocessing unit 1730 to perform the reprocessing on the stream.

The operations of the control unit 1720 of FIG. 7 are only an example, and the order of the operation (S210) of the resource checker 1722, the operation (S220) of the stream checker 1726, and the operation (S230) of the idle state checker 1724 is not limited to what is illustrated in FIG. 7 and may be variously changed. For example, three operations S210-S230 may be simultaneously performed. Alternatively, only at least some of the three operations S210-S230 may be simultaneously performed. In addition, when there is an additional operation that determines whether or not to perform reprocessing after transmitting the initial stream reprocessing command (e.g., periodically operating all or some of the resource checker 1722, the idle state checker 1724, and the stream checker 1726 to stop or restart the reprocessing operation, as described above with reference to FIG. 4), the corresponding operation may be added to the flowchart of FIG. 7.

Again referring to FIGS. 2, 3, and 6, when it is determined not to perform the reprocessing on the stream through the control unit 1720 (No at S200), the reprocessing is not performed on the stream (S300).

On the other hand, when the reprocessing unit 1730 receives the stream reprocessing command from the control unit 1720 (Yes at S200), the reprocessing unit 1730 performs the reprocessing on the stream (S400). A process (S400) of performing the reprocessing on the stream by the reprocessing unit 1730 will be described in detail with reference to FIG. 9.

Figure 8:
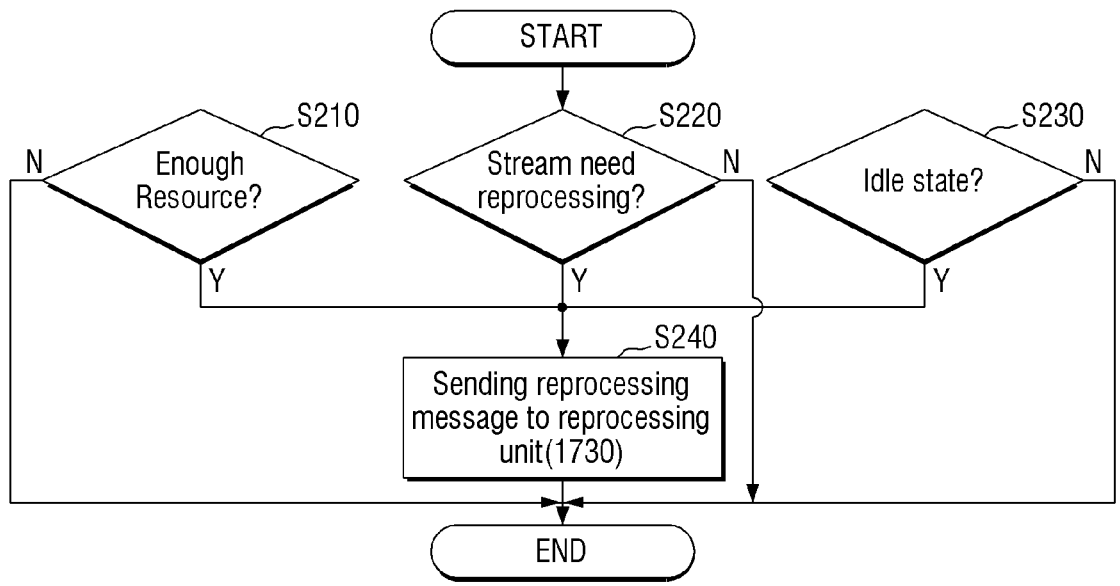
FIG. 8 is an illustrative flowchart for describing operations of a control unit in a stream reprocessor according to some exemplary embodiments.

FIG. 8 is another illustrative flowchart for describing operations of the control unit in the stream reprocessor according to some exemplary embodiments.

Referring to FIGS. 2, 3, 4, and 8, unlike the operations of the controller in the stream reprocessor of FIG. 7 according to some exemplary embodiments, a plurality of steps S210, S220, and S230 may operate in parallel.

In more detail, the control unit 1720 determines, by using the resource checker 1722, whether or not the stream reprocessing system 10 has secured resources enough for the stream reprocessor 1700 to reprocess the stream received through the input unit 1710 (S210). When it is determined that the resources enough for the stream reprocessor 1700 do not exist (No at S210), the reprocessing is not performed on the stream.

On the other hand, when it is determined that the resources enough for the stream reprocessor 1700 exist (Yes at S210), the control unit 1720 transmits a stream reprocessing command to the reprocessing unit 1730 (S240) to allow the reprocessing unit 1730 to perform the reprocessing on the stream.

In addition, the control unit 1720 determines, by using the stream checker 1726, whether or not the stream needs to be reprocessed (S220). When it is determined that the stream does not need to be reprocessed (No at S220), the reprocessing is not performed on the stream.

On the other hand, when it is determined that the stream needs to be reprocessed (Yes at S220), the control unit 1720 transmits a stream reprocessing command to the reprocessing unit 1730 (S240) to allow the reprocessing unit 1730 to perform the reprocessing on the stream.

In addition, the control unit 1720 determines, by using the idle state checker 1724, whether or not the electronic device including the stream reprocessing system 10 is in an idle state (e.g., whether or not the display has been turned off) (S230). When the electronic device including the stream reprocessing system 10 is not in the idle state (e.g., when the display has not been turned off) (No at S230), the reprocessing is not performed on the stream.

On the other hand, when the electronic device including the stream reprocessing system 10 is in the idle state (e.g., when the display has been turned off) (Yes at S230), the control unit 1720 sends a stream reprocessing command to the reprocessing unit 1730 (S240) to allow the reprocessing unit 1730 to perform the reprocessing on the stream.

That is, the control unit 1720 may transmit the stream reprocessing command to the reprocessing unit 1730 (S240) to control or allow the reprocessing unit 1730 to perform the reprocessing on the stream, even if only any one of the plurality of steps S210, S220, and S230 is satisfied.

Figure 9:
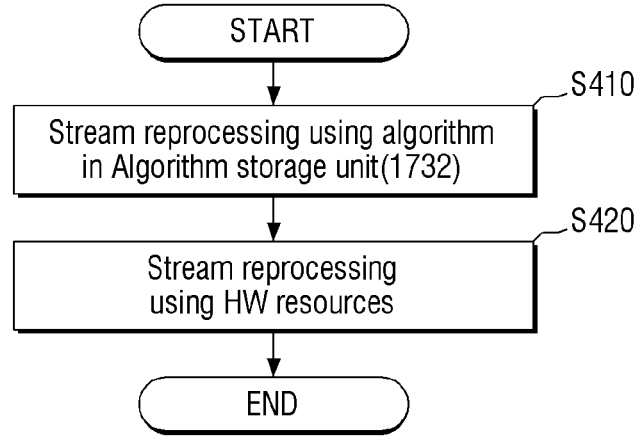
FIG. 9 is an illustrative flowchart for describing operations of a reprocessing unit in a stream reprocessor according to some exemplary embodiments.

FIG. 9 is an illustrative flowchart for describing operations of the reprocessing unit in the stream reprocessor according to some exemplary embodiments.

Referring to FIGS. 2, 3, 5, and 9, the reprocessing unit 1730 extracts and utilizes an algorithm related to performing the reprocessing on the stream from algorithms stored in the algorithm storage unit 1732 (S410). In this case, a detailed description for the utilized algorithm(s) is the same as that described with reference to FIG. 5, and is thus omitted.

The reprocessing unit 1730 may utilize, through the resource utilizing unit 1734, resources of general-purpose hardware (e.g., the central processing unit 1200, the neural processing unit 1300, and/or the graphics processing unit 1400) to execute the algorithm related to performing the reprocessing on the stream (S420). A description for this operation is the same as that described with reference to FIG. 5, and is thus omitted.

The order of the operation (S410) of the reprocessing unit 1730 extracting the algorithm from the algorithm storage unit 1732 and the operation (S420) of the reprocessing unit 1730 utilizing the resources through the resource utilizing unit 1734 are not limited thereto. For example, the operation (S410) of extracting the algorithm and the operation (S420) of utilizing the resources of the hardware may also be simultaneously performed.

Referring again to FIGS. 2, 3, and 6, the stream reprocessed through the reprocessing unit 1730 may be transmitted to components (e.g., the display controller 1500, the memory controller 1600, the codec 1100, the central processing unit 1200, the neural processing unit 1300, and/or the graphics processing unit 1400) other than the stream reprocessor 1700 through the output unit 1740.

Figure 10:
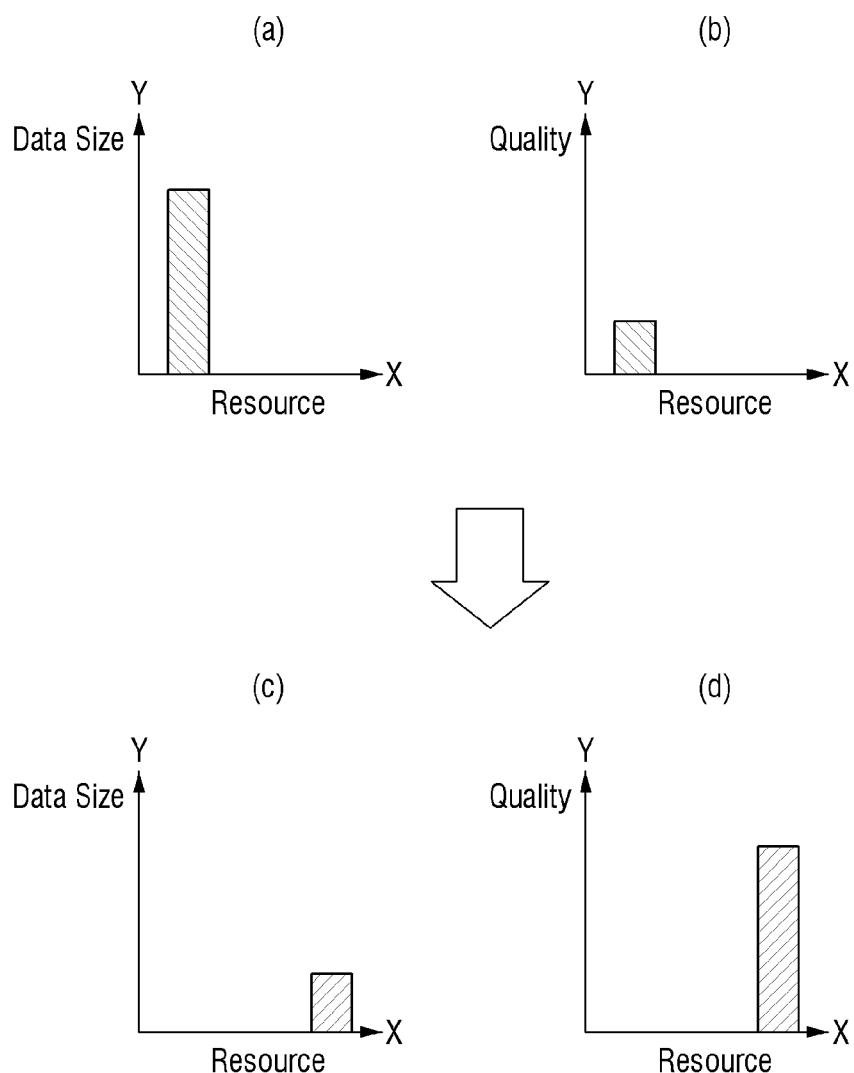
FIG. 10 is illustrative graphs for describing a change in data size and quality of stream through a stream reprocessing system according to some exemplary embodiments.

FIG. 10 is illustrative graphs for describing a change in data size and quality of stream through the stream reprocessing system according to some exemplary embodiments.

Referring to FIGS. 2, 3, and 10, in a case where the resources of the general-purpose hardware (e.g., the central processing unit 1200, the neural processing unit 1300, and/or the graphics processing unit 1400) are not utilized for reprocessing the stream and the stream is reprocessed with limited resources, stream compression efficiency is low, such that a data size may increase and a quality of the stream may also decrease, as illustrated in graphs (a) and (b) of FIG. 10. On the other hand, according to some exemplary embodiments, the reprocessing is performed on the stream by utilizing sufficient resources of the general-purpose hardware (e.g., the central processing unit 1200, the neural processing unit 1300, and/or the graphics processing unit 1400) as in the stream reprocessor 1700, and therefore stream compression efficiency is improved. Accordingly, the stream may be reprocessed at a small data size and a quality of the stream may also be improved, as illustrated in graphs (c) and (d) of FIG. 10.

Hereinafter, another stream reprocessing system according to some exemplary embodiments will be described. A description overlapping with what has been described above is omitted for simplification of explanation.

Figure 11:
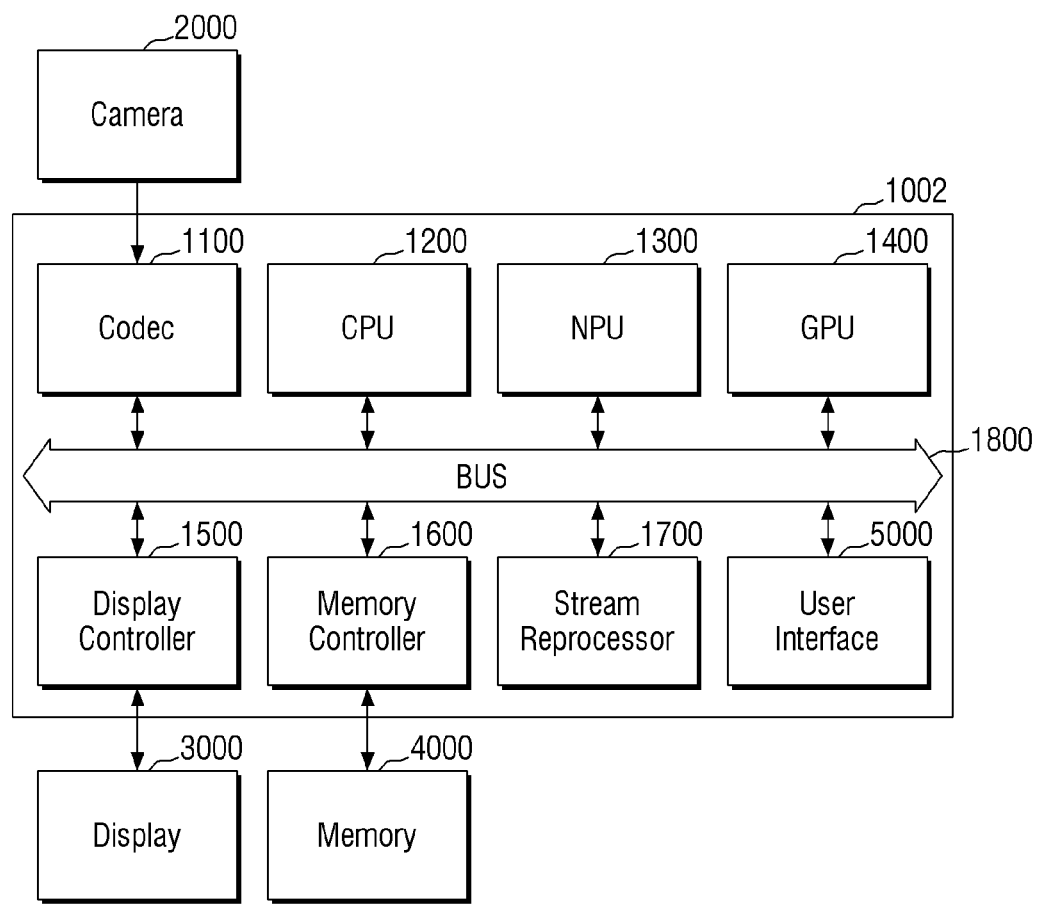
FIG. 11 is an illustrative block diagram for describing a stream reprocessing system according to some exemplary embodiments.

FIG. 11 is an illustrative block diagram for describing another stream reprocessing system 20 according to some exemplary embodiments.

Referring to FIG. 11, the stream reprocessing system includes a system on chip 1002, in which a user interface 5000 may be further added, compared to the system on chip 1000 of FIG. 2.

The user interface 5000 may process a user input that is received from a user of the stream reprocessing system 20, and transmit the processed user input to the bus 1800. For example, the user interface 5000 may be implemented as an interface capable of processing a voice signal and/or an interface capable of processing a touch input of the user. For example, when the user interface 5000 is the interface (e.g., a touch screen or a touch screen controller) capable of processing the touch input, the user interface 5000 may process the touch input received through the display 3000.

The user of the stream reprocessing system 20 may participate in an operation of the stream reprocessor 1700 according to some exemplary embodiments, through the user interface 5000. This will be described in detail with reference to FIGS. 12 to 14.

Figure 12:
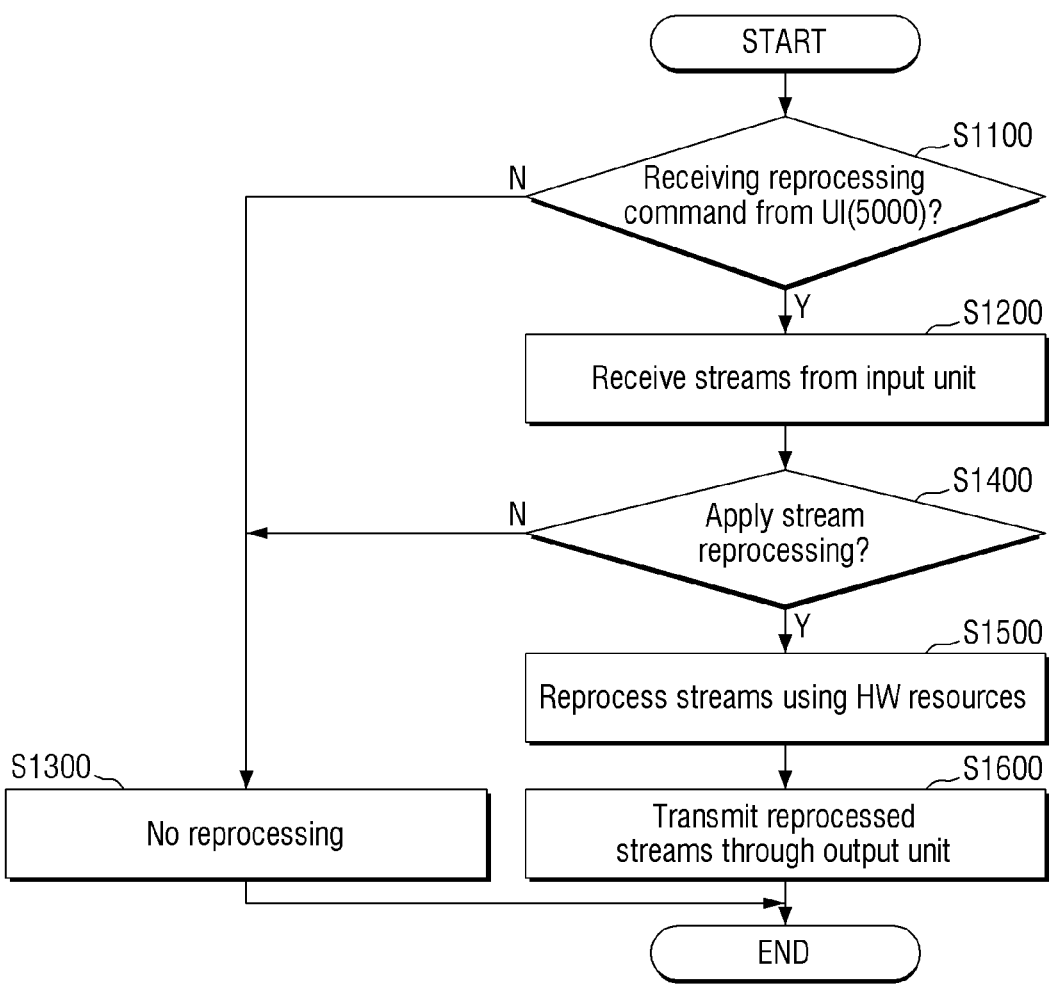
FIGS. 12 to 14 are illustrative flowcharts for describing operations of a stream reprocessing system according to some exemplary embodiments.
Figure 13:
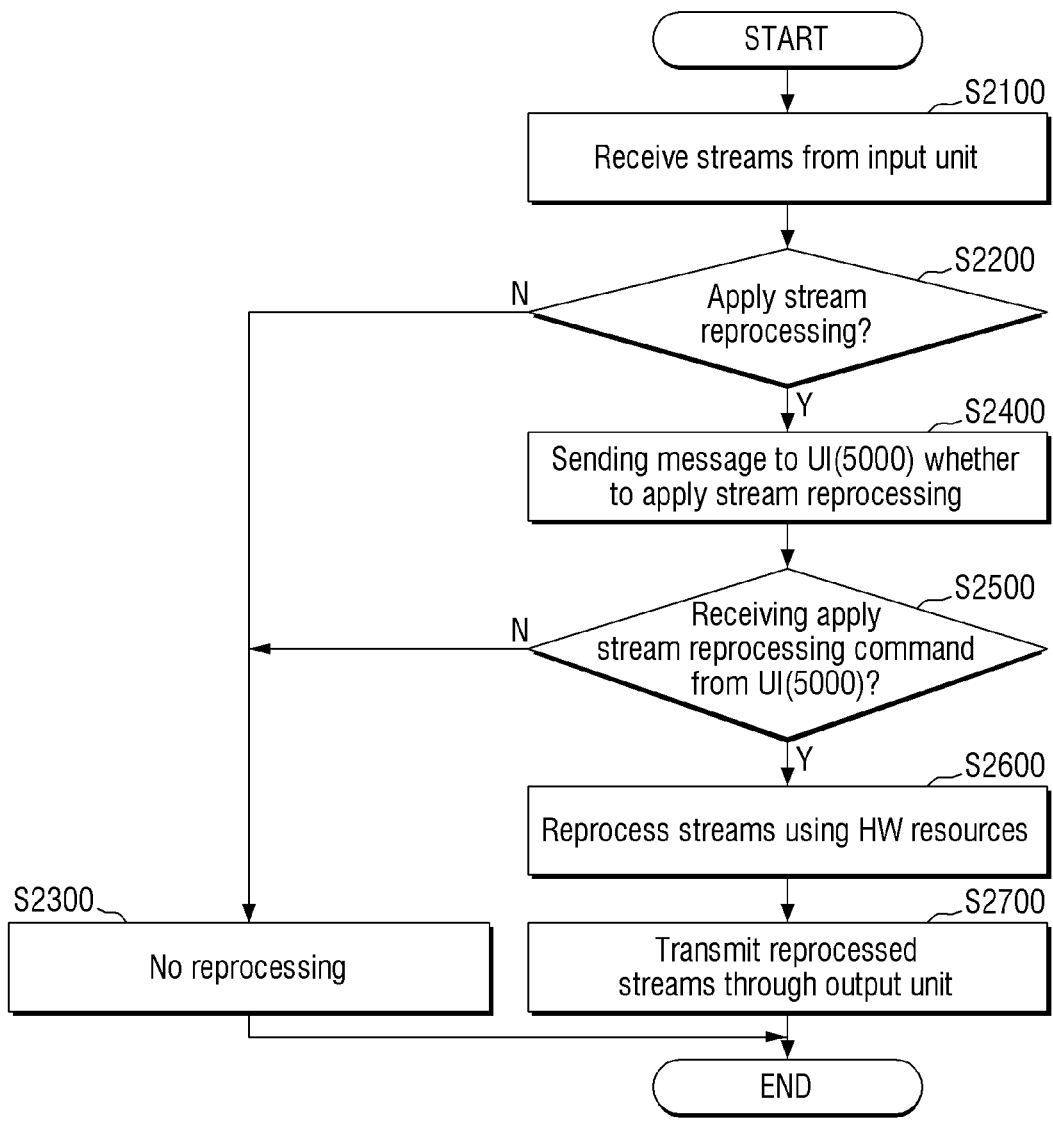
Figure 14:
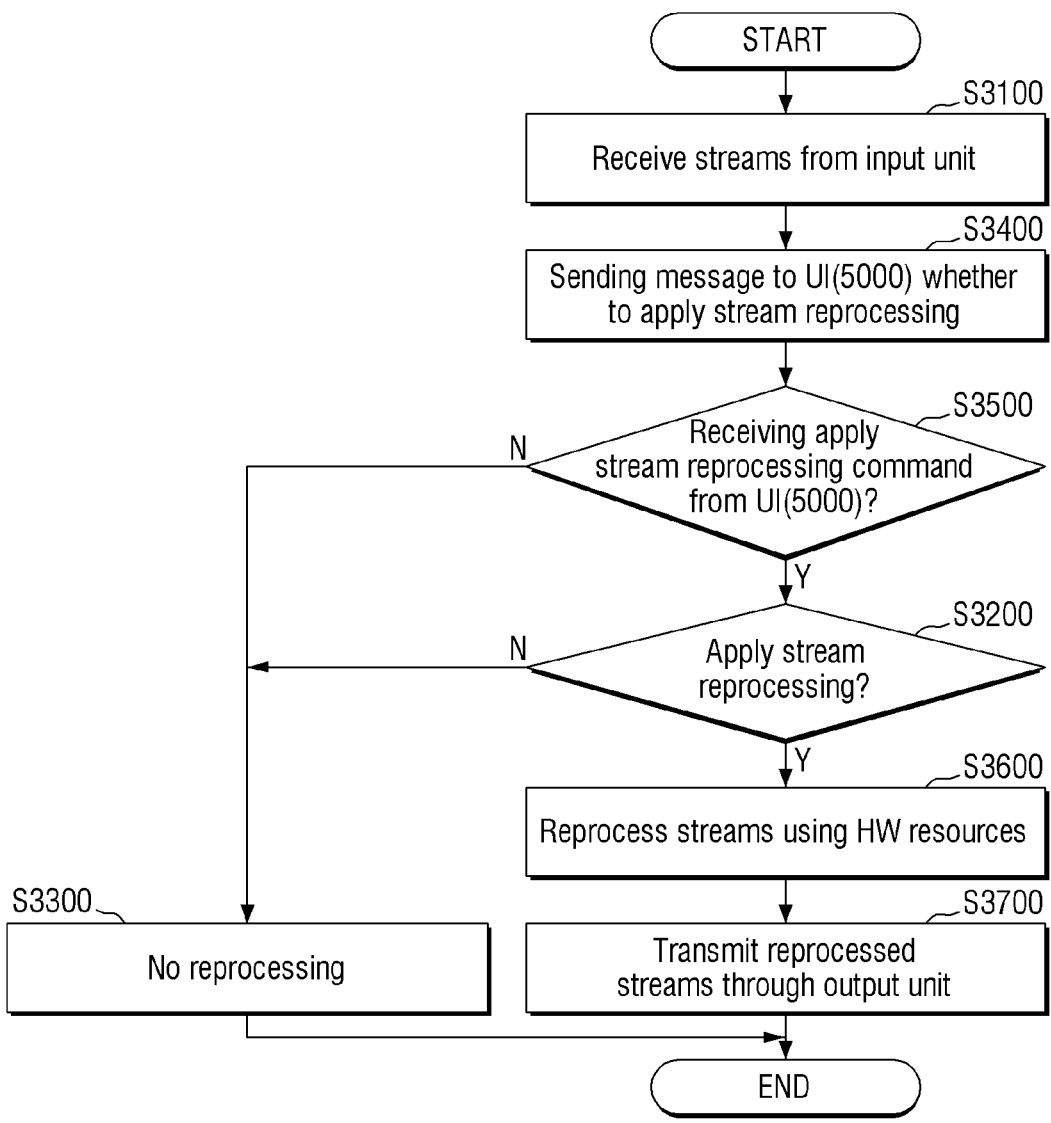

FIGS. 12 to 14 are illustrative flowcharts for describing operations of the stream reprocessing system according to some exemplary embodiments.

First, referring to FIGS. 11 and 12, the stream reprocessing system 20 determines whether or not a stream reprocessing command is received from the user through the user interface 5000 (S1100). When the stream reprocessing system 20 has not received the stream reprocessing command from the user (No at S1100), the stream reprocessing system 20 does not perform a stream reprocessing operation (S1300).

On the other hand, when the stream reprocessing system 20 has received the stream reprocessing command from the user through the user interface 5000 (Yes at S1100), the stream reprocessing system 20 may perform stream reprocessing operations S1200, S1400, S1500, and S1600 according to some exemplary embodiments. The stream reprocessing operations S1200, S1400, S1500, and S1600 according to some exemplary embodiments are similar to the stream reprocessing operations S100, S200, S400, and S500 according to some exemplary embodiments described with reference to FIG. 6, and a description therefor is thus omitted.

As another example, referring to FIGS. 11 and 13, the stream reprocessing system 20 performs operations S2100, S2200, and S2300. The operations S2100, S2200, and S2300 of the stream reprocessing system 20 are similar to the operations S100, S200, and S300 of FIG. 6, and a description therefor is thus omitted.

When it is determined by the control unit of the stream reprocessor 1700 that a reprocessing condition for the stream has been satisfied (Yes at S2200), the stream reprocessor 1700 may send a message regarding whether or not to perform the stream reprocessing operations to the user of the stream reprocessing system 20 through the user interface 5000 (S2400).

Then, the stream reprocessor 1700 checks whether or not the stream reprocessing system 20 has received a stream reprocessing operation performing command from the user (S2500).

When the stream reprocessing system 20 has not received the stream reprocessing operation performing command from the user (No at S2500), the stream reprocessing system 20 does not perform stream reprocessing operations (S2300).

On the other hand, when the stream reprocessing system 20 has received the stream reprocessing operation performing command from the user (Yes at S2500), the stream reprocessing system 20 performs stream reprocessing operations S2600 and S2700. The stream reprocessing operations S2600 and S2700 of the stream reprocessing system 20 are similar to the operations S400 and S500 of FIG. 6, and a description therefor is thus omitted.

As another example, referring to FIGS. 11 and 14, the stream reprocessing system 20 performs an operation S3100. The operation S3100 of the stream reprocessing system 20 is similar to the operation S100 of FIG. 6, and a description therefor is thus omitted.

The stream reprocessor 1700 may send a message regarding whether or not to perform stream reprocessing operations to the user of the stream reprocessing system 20 through the user interface 5000 (S3400).

Then, the stream reprocessor 1700 checks whether or not the stream reprocessing system 20 has received a stream reprocessing operation performing command from the user (S3500).

When the stream reprocessing system 20 has not received the stream reprocessing operation performing command from the user (No at S3500), the stream reprocessing system 20 does not perform stream reprocessing operations (S3300).

On the other hand, when the stream reprocessing system 20 has received the stream reprocessing operation performing command from the user (Yes at S3500), the stream reprocessing system 20 performs stream reprocessing operations S3200, S3300, S3600, and S3700. The stream reprocessing operations S3200, S3300, S3600, and S3700 of the stream reprocessing system 20 are similar to the operations S200, S300, S400, and S500 of FIG. 6, and a description therefor is thus omitted.

Figure 15:
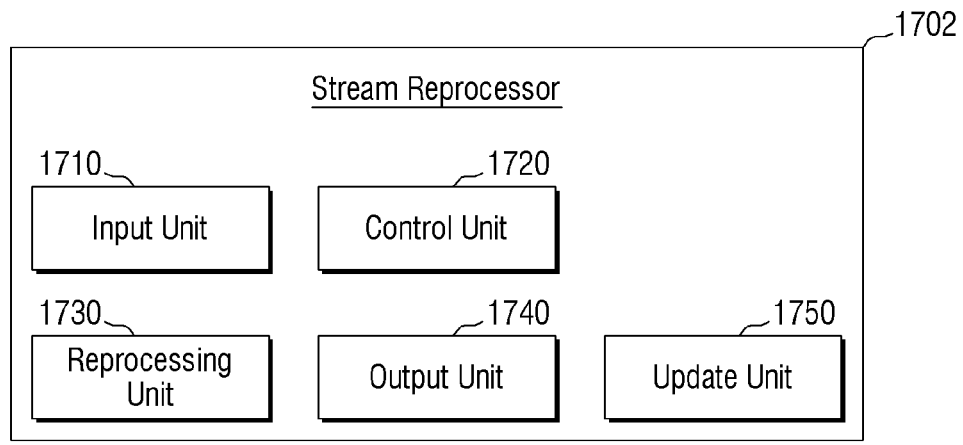
FIG. 15 is an illustrative block diagram for describing a stream reprocessor according to some exemplary embodiments.

FIG. 15 is an illustrative block diagram for describing another stream reprocessor according to some exemplary embodiments.

Referring to FIGS. 11 and 15, a stream reprocessor 1702 according to some exemplary embodiments may be configured as software.

In this case, the stream reprocessor 1702 may further include an update unit 1750, in addition to the components of the stream reprocessor 1700 of FIG. 3.

The update unit 1750 may check whether or not to update the stream reprocessor 1702, receive a confirmation regarding whether or not to perform the update from the user of the stream reprocessing system 20 through the user interface 5000 when update information of the stream reprocessor 1702 is checked, and update software (e.g., application software, algorithm software, firmware, etc.) related to the stream reprocessor 1702.

Operations for this aspect will be described in detail with reference to a flowchart of FIG. 16.

Figure 16:
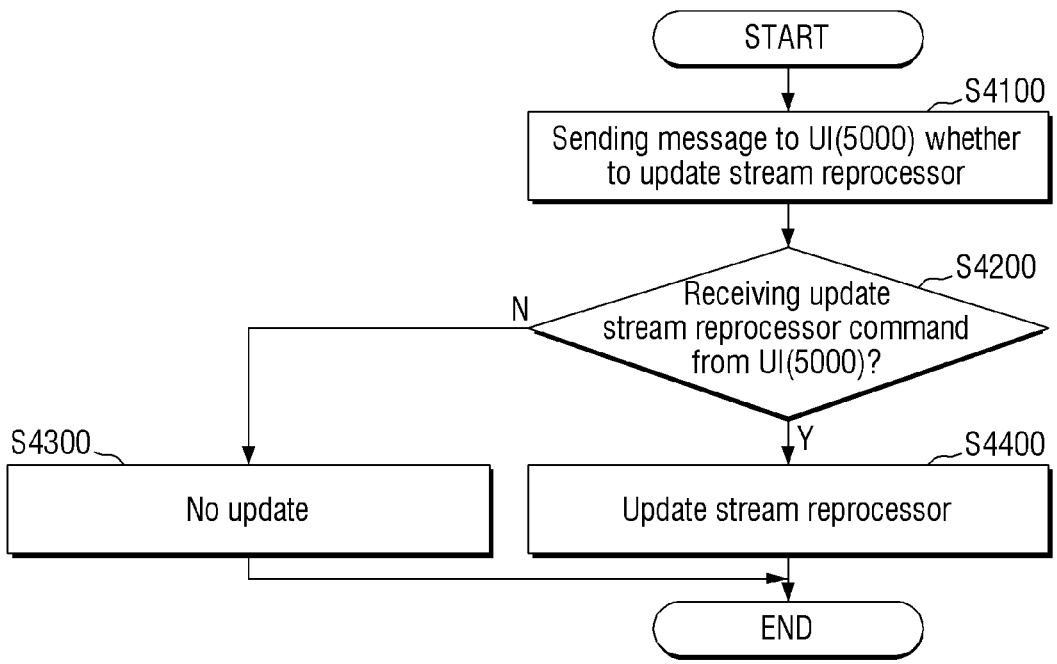
FIG. 16 is an illustrative flowchart for describing operations of a stream reprocessor according to some exemplary embodiments.

FIG. 16 is an illustrative flowchart for describing operations of another stream reprocessor according to some exemplary embodiments.

Referring to FIGS. 11, 15, and 16, the update unit 1750 that has checked software update of the stream reprocessor 1702 sends a message regarding whether or not to perform the software update of the stream reprocessor 1702 to the user of the stream reprocessing system 20 through the user interface 5000 (S4100). For example, the update unit 1750 may send the message at S4100 based on a determination that there is an update to be made to the stream reprocessor 1702.

Then, the stream reprocessor 1702 checks whether or not a software update performing command of the stream reprocessor 1702 has been received from the user (S4200).

When the stream reprocessor 1702 has not received the software update performing command of the stream reprocessor 1702 from the user (No at S4200), the stream reprocessor 1702 does not perform the update of the stream reprocessor 1702.

On the other hand, when the stream reprocessor 1702 has received the software update performing command of the stream reprocessor 1702 from the user (Yes at S4200), the stream reprocessor 1702 performs the update of the stream reprocessor 1702 (S4400).

Figure 17:
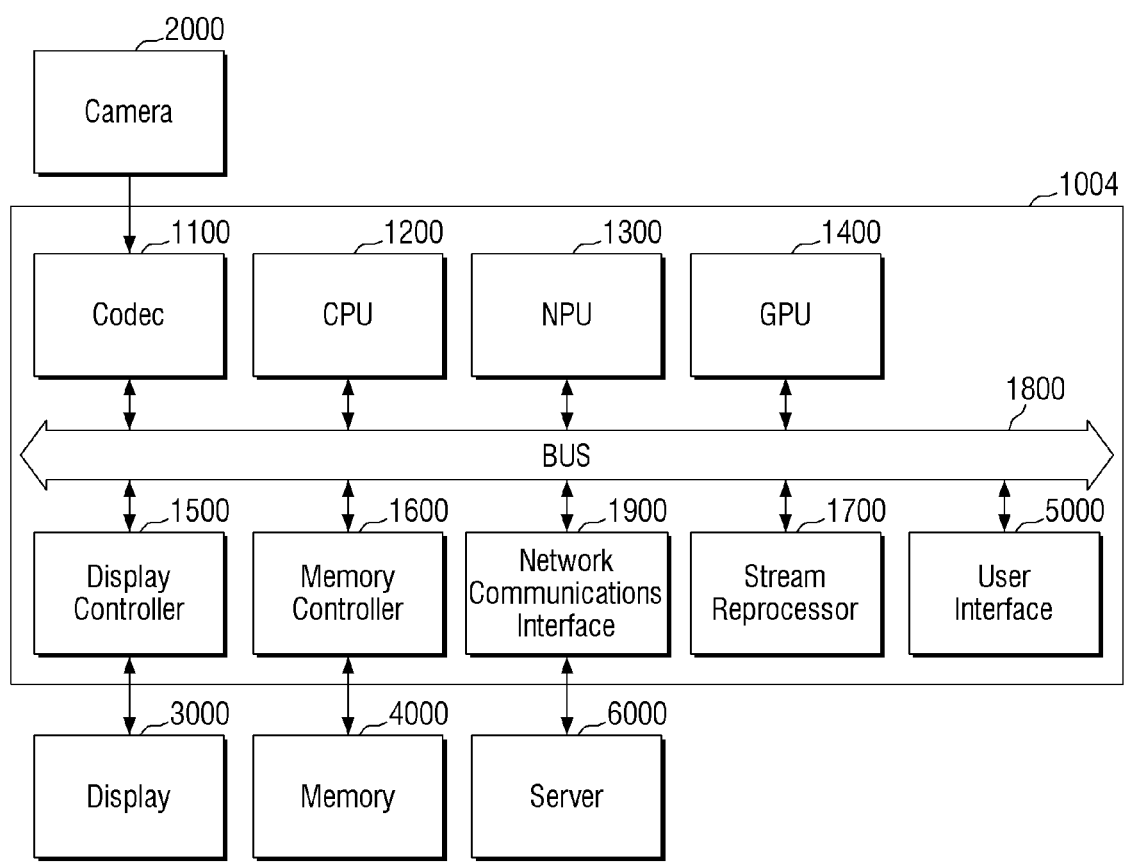
FIG. 17 is an illustrative block diagram for describing a stream reprocessing system according to some exemplary embodiments.

FIG. 17 is an illustrative block diagram for describing another stream reprocessing system according to some exemplary embodiments.

Referring to FIG. 17, in a system on chip 1004, a network communications interface 1900 may be further added to the system on chip 1004, compared to the system on chip 1002 of FIG. 11. In addition, in a stream reprocessing system 30, a server 6000 may be further added to the stream reprocessing system 30, compared to the stream reprocessing system 20 of FIG. 11.

The network communications interface 1900 may support establishing a direct (e.g., wired) communications channel or a wireless communications channel between the system on chip 1004 and the server 6000 and performing communications through the established communications channel.

The network communications interface 1900 may include one or more communications processors that are operable independently of the central processing unit 1200 (e.g., an AP) and support direct (e.g., wired) communications or wireless communications.

According to some exemplary embodiments, the network communications interface 1900 may include a wireless communications module (e.g., a cellular communications module, a short-range wireless communications module, or a global navigation satellite system (GNSS)) or a wired communications module (e.g., a local area network (LAN) communications module or a power line communications (PLC) module).

A corresponding one of these communications modules may communicate with the server 6000 through a network (e.g., a short-range communications network such as a standard of Bluetooth™, wireless-fidelity (Wi-Fi) direct, or the infrared data association (IrDA)) or another network (e.g., a long-range communications network such as a cellular network, the Internet, or a computer network (e.g., a LAN or a wide area network (WAN)).

These various types of communications modules may be implemented as a single component (e.g., a single integrated chip (IC)) or may be implemented as multiple components (e.g., multiple ICs) separated from each other.

The network communications interface 1900 may identify and authenticate an electronic device in a communications network using subscriber information (e.g., international mobile subscriber identity (IMSI)) stored in a subscriber identification module.

According to some exemplary embodiments, commands or data of the system on chip 1004 may be transmitted to or received from the server 6000 through a network coupled to the network communications interface 1900.

The server 6000 may be the same type of device as the system on chip 1004 or be a different type of device from the system on chip 1004. According to some exemplary embodiments, all or some of operations to be executed on the system on chip 1004 may be executed on the server 6000.

For example, when the system on chip 1004 requests the server 6000 to perform a function or a service, the function or the service may be performed by the server 6000, and the server 6000 may transmit a result of performing the function or the service to the system on chip 1004. To this end, for example, cloud computing, distributed computing, and/or client-server computing technology may be used. That is, a processor that controls input/output of data and a memory in which the data is stored may be included in the server 6000 itself.

For example, application software capable of performing the stream reprocessing system including a function of the stream reprocessor 1700 may be stored in the server 6000 and be downloaded into the system on chip 1004 according to a user's request. In addition, for example, a stream to be reprocessed by the stream reprocessor 1700 may be stored in the server 6000, and the stream reprocessor 1700 may receive the stream from the server 6000 and perform reprocessing on the received stream.

Operations of the stream reprocessing system 30 according to some exemplary embodiments will be described in detail with reference to flowcharts of FIGS. 18 to 22.

FIGS. 18 to 22 are illustrative flowcharts for describing operations of the stream reprocessing system according to some exemplary embodiments.

Figure 18:
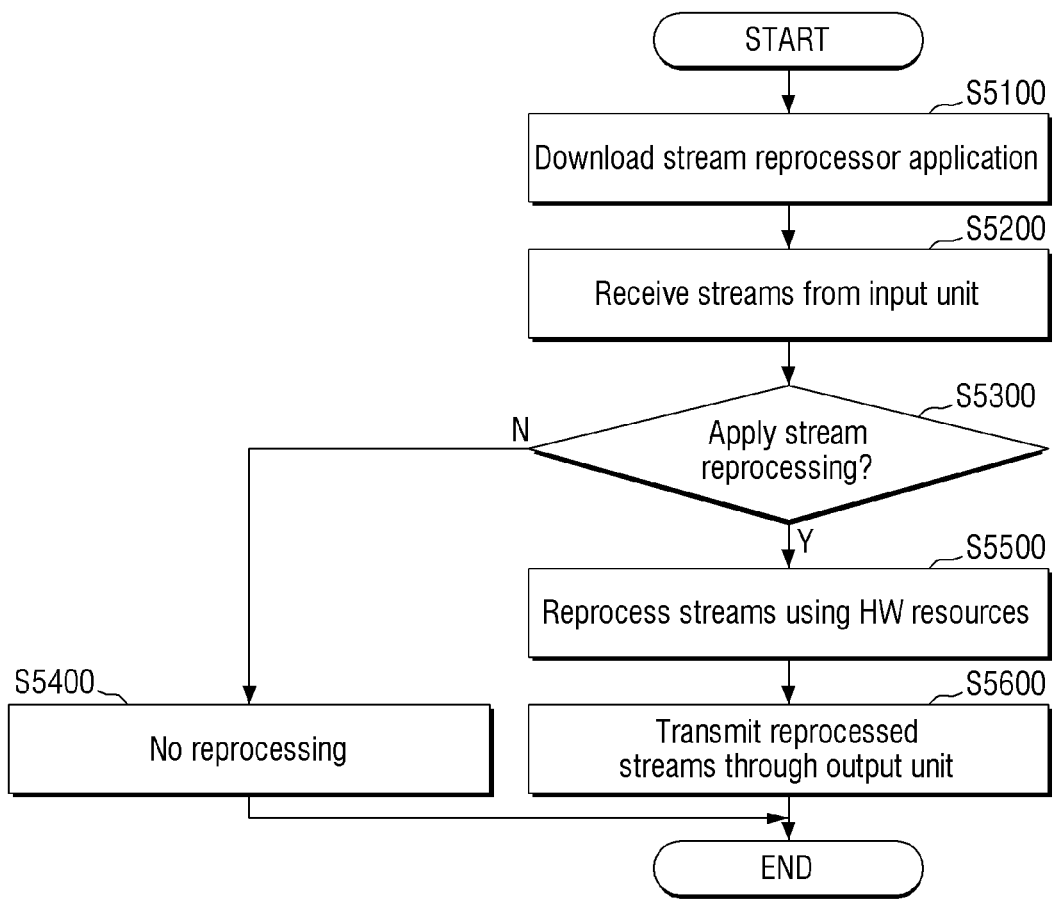
FIGS. 18 to 22 are illustrative flowcharts for describing operations of a stream reprocessing system according to some exemplary embodiments.

First, referring to FIGS. 17 and 18, a user of the stream reprocessing system 30 may download stream reprocessing application software including a function of the stream reprocessor 1700 into the system on chip 1004 through the server 6000 (S5100).

The subsequent operations S5200, S5300, S5400, S5500, and S5600 of the stream reprocessing system 30 are similar to the operations S100, S200, S300, S400, and S500 of the stream reprocessing system 10 of FIG. 6, and an overlapping description is thus omitted.

Figure 19:
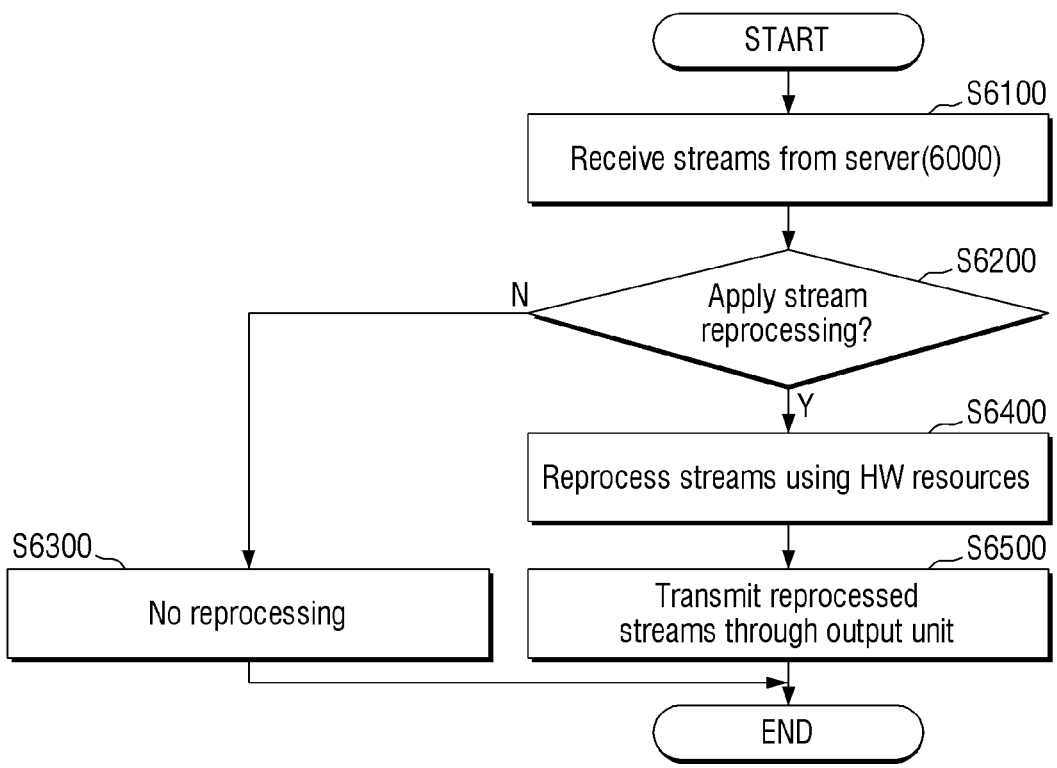

As another example, referring to FIGS. 17 and 19, the stream reprocessor 1700 of the stream reprocessing system 30 may receive a stream to be reprocessed from the server 6000 (S6100).

The subsequent operations S6200, S6300, S6400, and S6500 of the stream reprocessing system 30 are similar to the operations S200, S300, S400, and S500 of the stream reprocessing system 10 of FIG. 6, and an overlapping description is thus omitted.

Figure 20:
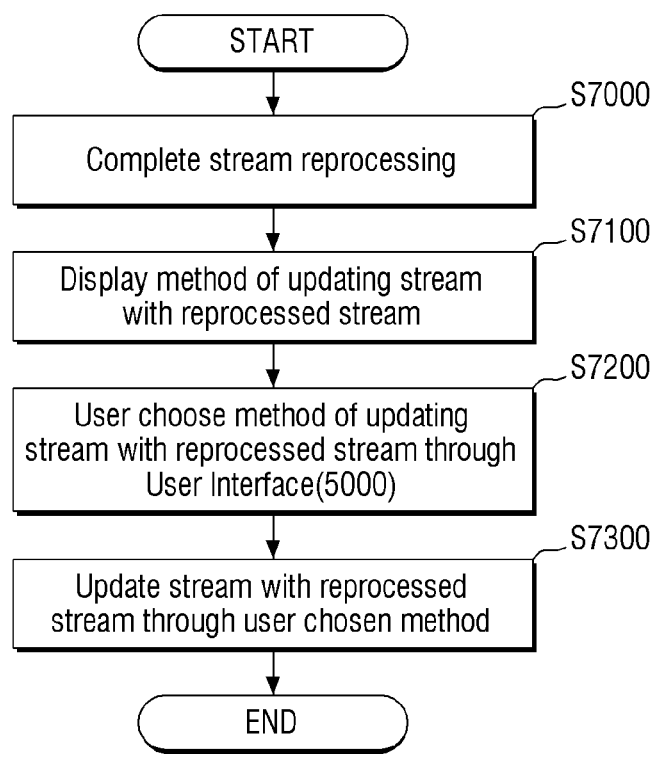

As another example, referring to FIGS. 17 and 20, reprocessing of the stream is performed through the stream reprocessor 1700 (S7000), based on the contents described above with reference to FIGS. 2 to 19.

Then, a method of updating the reprocessed stream is displayed through the display 3000 (S7100).

Then, the user of the stream reprocessing system 30 according to some exemplary embodiments may choose the method of updating the reprocessed stream displayed on the display 3000 through the user interface 5000 (S7200).

For example, when the user interface 5000 is an interface capable of processing a voice signal, the user may choose the method of updating the reprocessed stream through the voice signal. Alternatively, when the user interface 5000 is implemented as an interface capable of processing a touch input of the user, the user may choose the method of updating the reprocessed stream through a touch operation on the display 3000.

The method of updating the stream reprocessed through the stream reprocessor 1700 according to some exemplary embodiments may be, for example, a method of deleting the stream before being reprocessed, which is stored in the outside of the stream reprocessor 1700 (e.g., the memory 4000 and/or the server 6000), and then storing the reprocessed stream in the outside (e.g., the memory 4000 and/or the server 6000).

Alternatively, the method of updating the stream reprocessed through the stream reprocessor 1700 according to some exemplary embodiments may be, for example, a method of maintaining the stream before being reprocessed, stored in the outside (e.g., the memory 4000 and/or the server 6000) and additionally storing the reprocessed stream in the outside (e.g., the memory 4000 and/or the server 6000).

Figure 21:
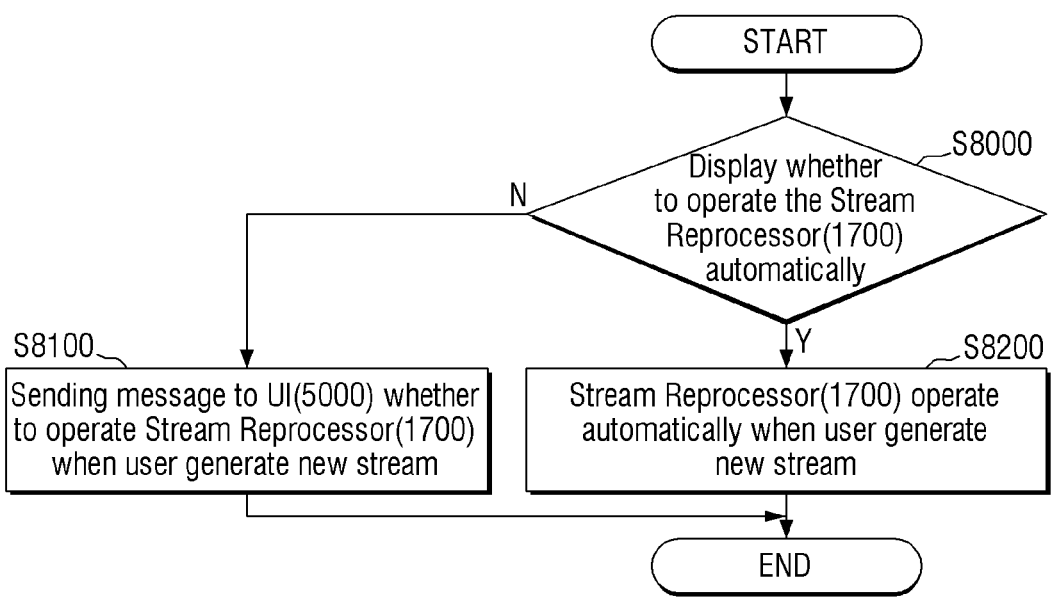

As another example, referring to FIGS. 17 and 21, the user of the stream reprocessing system 30 according to some exemplary embodiments may choose, in advance, whether or not the stream reprocessor 1700 described above with reference to FIGS. 2 to 19 automatically performs stream reprocessing operations.

In more detail, it is displayed through the display 3000 whether or not to automatically perform reprocessing, through the stream reprocessor 1700, on a stream generated by the user of the stream reprocessing system 30 from the outside (e.g., the memory 4000 and/or the server 6000) (S8000).

When the user does not send a command to automatically perform the reprocessing on the stream generated by the user through the user interface 5000 (No at S8000), whenever a stream generated by the user is received, the stream reprocessing system 30 sends a message regarding whether or not to perform the stream reprocessing operations on the stream through the stream reprocessor 1700 each time, through the user interface 5000 (S8100).

On the other hand, when the user sends the command to automatically perform the reprocessing on the stream generated by the user through the user interface 5000 (Yes at S8000), the stream reprocessor 1700 may automatically perform the stream reprocessing operations described above with reference to FIGS. 2 to 19 on the stream generated by the user (S8200).

Figure 22:
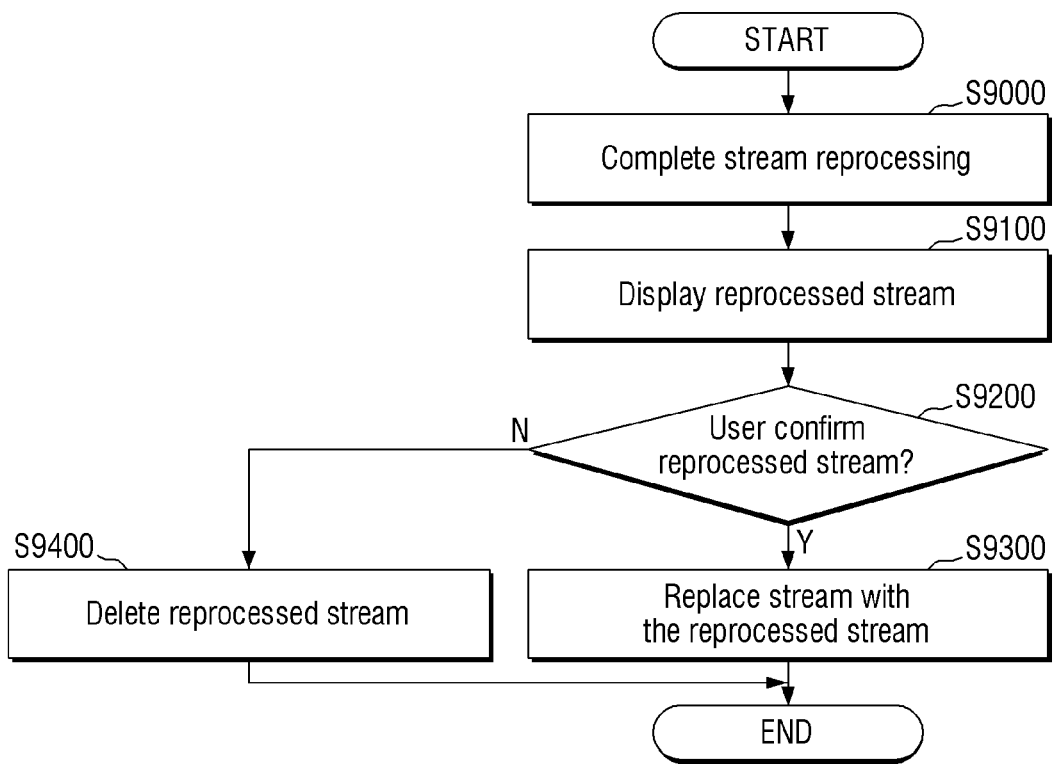

As another example, referring to FIGS. 17 and 22, the user of the stream reprocessing system 30 according to some exemplary embodiments may choose whether or not to use a stream on which reprocessing is performed through the stream reprocessor 1700 described above with reference to FIGS. 2 to 19.

First, reprocessing of the stream is performed by the stream reprocessor 1700 (S9000), based on the contents described above with reference to FIGS. 2 to 19.

Then, the stream reprocessed through the stream reprocessor 1700 is displayed through the display 3000 (S9100).

Then, when the user permits the reprocessed stream to be used through the stream reprocessor 1700 through the user interface 5000 (Yes at S9200), an existing stream is replaced with the reprocessed stream (S9300). For example, the existing stream may be deleted from the memory 4000 or the server 6000 and the reprocessed stream may be stored in the memory 4000 or the server 6000.

When the user determines not to use the stream reprocessed through the stream reprocessor 1700 through the user interface 5000 (No at S9200), the reprocessed stream may be deleted and the existing stream may remain in the memory 4000 or the server 6000 (S9400).

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims and their equivalents. It should be understood that the exemplary embodiments are considered in all respects as illustrative and not restrictive.

What is claimed is:

1. A stream reprocessing system on chip, comprising:
   a plurality of processors including a central processing unit (CPU);
   a memory controller configured to receive a stream; and
   a stream reprocessor configured to perform reprocessing the stream,
   wherein the stream reprocessor includes:
      a control unit configured to determine whether to perform the reprocessing on the stream;
      a reprocessing unit configured to reprocess the stream based on receiving a command to perform the reprocessing on the stream from the control unit; and
      an output unit configured to transmit the reprocessed stream to a memory,
   wherein the control unit includes:
      a resource checker configured to determine whether resources are sufficient to perform the reprocessing on the stream (i) based on a state of charge (SoC) of a battery and (ii) by periodically checking utilized resources of background applications; and
      a stream checker configured to determine whether an image quality of the stream is less than a certain image quality by using a predetermined algorithm, and
   wherein the control unit is configured to transmit, to the reprocessing unit, the command to perform the reprocessing on the stream to increase the image quality of the stream, based on a determination that the resources are sufficient and further based on a determination that the image quality of the stream is less than the certain image quality.

2. The stream reprocessing system on chip of claim 1, further comprising a user interface configured to receive a stream reprocessing command from an outside,
   wherein the control unit is configured to determine whether to perform the reprocessing on the stream based on the stream reprocessing command.

3. The stream reprocessing system on chip of claim 1, wherein the stream reprocessor is configured as software.

4. The stream reprocessing system on chip of claim 3, wherein the stream reprocessor further includes an update unit, and
   wherein the update unit is configured to determine whether to update the stream reprocessor and update the stream reprocessor based on a determination to update the stream reprocessor.

5. The stream reprocessing system on chip of claim 1, further comprising a network communications interface configured to communicate with an outside through a network,
   wherein the stream reprocessor is downloadable as an application through the network communications interface.

6. The stream reprocessing system on chip of claim 1, wherein the reprocessing unit includes an algorithm storage unit configured to store an algorithm for reprocessing the stream.

7. The stream reprocessing system on chip of claim 6, wherein the algorithm includes at least one of a codec algorithm, a super-resolution (SR) algorithm, a frame rate conversion (FRC) algorithm, an image signal processing (ISP) algorithm, or a denoising algorithm.

8. The stream reprocessing system on chip of claim 6, wherein the algorithm includes at least one of a multi pass coding algorithm, a rate distortion optimization (RDO) algorithm, a group of pictures (GOP) algorithm, or a standard change algorithm.

9. The stream reprocessing system on chip of claim 1, wherein the reprocessing unit includes a resource utilizing unit configured to utilize a resource of at least one of the plurality of processors.

10. A stream reprocessing system comprising:
a camera;
a codec configured to generate a stream by compressing frames received through the camera;
a plurality of processors including a central processing unit, the central processing unit being configured to control the codec;
a display configured to, under control of at least one of the plurality of processors, output the stream compressed through the codec;
a memory configured to store the stream; and
a stream reprocessor configured to reprocess the stream, wherein the stream reprocessor includes:
 a control unit configured to determine whether to perform the reprocessing on the stream;
 a reprocessing unit reprocessing the stream based on receiving a command to perform the reprocessing on the stream from the control unit; and
 an output unit configured to transmit the reprocessed stream to the memory,
wherein the control unit includes:
 a resource checker configured to determine whether resources are sufficient to perform the reprocessing on the stream (i) based on a state of charge (SoC) of a battery and (ii) by periodically checking utilized resources of background applications; and
 a stream checker configured to determine whether an image quality of the stream is less than a certain image quality by using a predetermined algorithm, and
wherein the control unit is configured to transmit, to the reprocessing unit, the command to perform the reprocessing on the stream to increase the image quality of the stream based on a determination that the resources are sufficient, the display has been turned off, and the image quality of the stream is less than the certain image quality.

11. The stream reprocessing system of claim 10, wherein the control unit further includes:
an idle state checker configured to determine whether the display has been turned off, and
wherein the control unit is configured to transmit the command to perform the reprocessing on the stream to the reprocessing unit further based on a determination that the display has been turned off.

12. The stream reprocessing system of claim 10, further comprising a user interface configured to receive a stream reprocessing command from an outside,
wherein the control unit is configured to determine whether to perform the reprocessing on the stream based on the stream reprocessing command.

13. The stream reprocessing system of claim 10, wherein the stream reprocessor is configured as software.

14. The stream reprocessing system of claim 10, further comprising:
a server; and
a network communications interface configured to communicate with the server through a network,
wherein the stream reprocessor is downloadable as an application from the server.

15. The stream reprocessing system of claim 10, wherein the reprocessing unit includes an algorithm storage unit configured to store an algorithm for reprocessing the stream.

16. The stream reprocessing system of claim 15, wherein the algorithm includes at least one of a codec algorithm, a super-resolution (SR) algorithm, a frame rate conversion (FRC) algorithm, an image signal processing (ISP) algorithm, or a denoising algorithm.

17. The stream reprocessing system of claim 15, wherein the algorithm includes at least one of a multi pass coding algorithm, a rate distortion optimization (RDO) algorithm, a group of pictures (GOP) algorithm, or a standard change algorithm.

18. The stream reprocessing system of claim 10, wherein the reprocessing unit includes a resource utilizing unit configured to utilize a resource of at least one of the plurality of processors.

19. A stream reprocessing system comprising:
a processor configured to control at least one of an input or an output of a stream; and
a memory configured to store the stream,
wherein the stream is reprocessed based on a degree of compression of the stream determined through at least one of a codec algorithm, a super-resolution (SR) algorithm, a frame rate conversion (FRC) algorithm, an image signal processing (ISP) algorithm, or a denoising algorithm operating in non-real time, and
wherein the stream is reprocessed to increase an image quality of the stream upon a determination that resources are sufficient to perform the reprocessing on the stream (i) based on a state of charge (SoC) of a battery and (ii) by periodically checking utilized resources of background applications; and a determination that the image quality of the stream is less than a certain image quality by using a predetermined algorithm.

* * * * *